US009886025B2

(12) United States Patent
Kubo et al.

(10) Patent No.: US 9,886,025 B2
(45) Date of Patent: Feb. 6, 2018

(54) NUMERICAL CONTROLLER WITH AN I/O CONTROL UNIT THAT GENERATES CONTROL INFORMATION USING A PROCESSOR OF THE I/O CONTROL UNIT

(71) Applicant: FANUC Corporation, Yamanashi (JP)

(72) Inventors: Yoshiyuki Kubo, Yamanashi (JP); Kenichiro Kurihara, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 201 days.

(21) Appl. No.: 14/830,031

(22) Filed: Aug. 19, 2015

(65) Prior Publication Data

US 2016/0062342 A1 Mar. 3, 2016

(30) Foreign Application Priority Data

Aug. 26, 2014 (JP) ................................ 2014-171868

(51) Int. Cl.
*G06F 19/00* (2011.01)
*G05B 19/414* (2006.01)

(52) U.S. Cl.
CPC .. *G05B 19/414* (2013.01); *G05B 2219/31112* (2013.01)

(58) Field of Classification Search
CPC .................... G05B 19/414; G05B 2219/31112
USPC ........................................................ 700/170
See application file for complete search history.

(56) References Cited

U.S. PATENT DOCUMENTS

2002/0177920 A1* 11/2002 Kasagami ............... H02P 6/085 700/170
2005/0265417 A1* 12/2005 Fallon ..................... H01S 3/097 372/55
2006/0037951 A1* 2/2006 Otsuka .............. B23K 26/0884 219/121.78
2006/0178770 A1 8/2006 Egawa et al.
2009/0206782 A1* 8/2009 Ishikawa ................ B41J 19/202 318/400.04
2013/0190921 A1 7/2013 Maekawa
2013/0277885 A1 10/2013 Nagami (Continued)

FOREIGN PATENT DOCUMENTS

CN 1817548 A 8/2006
CN 103217927 A 7/2013
DE 10 2013 012 790 A1 2/2014

(Continued)

OTHER PUBLICATIONS

Office Action in JP Application No: 2014-171868, dated Dec. 15, 2015.

(Continued)

*Primary Examiner* — Robert Cassity
(74) *Attorney, Agent, or Firm* — Hauptman Ham, LLP

(57) ABSTRACT

An I/O control system includes a numerical controller, amplifiers that drive motors, and an I/O control unit that is connected to a peripheral device. The I/O control unit includes an arithmetic processing unit that generates control information for control over the peripheral device from servo control information received through a communication interface and input data received from the peripheral device through an I/O interface and that outputs the generated control information to the peripheral device through the I/O interface.

10 Claims, 6 Drawing Sheets

(56) References Cited

U.S. PATENT DOCUMENTS

2014/0042950 A1 2/2014 Aoyama et al.
2014/0156057 A1* 6/2014 Tong .................. G05B 19/4065
700/175

FOREIGN PATENT DOCUMENTS

JP 10-71542 A 3/1998
JP 2006-247745 A 9/2006
JP 2010-231407 A 10/2010

OTHER PUBLICATIONS

Office Action in CN Application No. 201510531474.3, dated Mar. 15, 2017.
Office Action issued in application No. DE 10 2015 113 696.1; dated Dec. 6, 2017, 11 pages.

* cited by examiner

I/O CONTROL UNIT
30
31
PROCESSOR SYSTEM
34
PROCESSOR
DMA CONTROLLER
GENERAL-PURPOSE FIELDBUS I/F
TIMER
GENERAL-PURPOSE I/O I/F
CPU CORE
SERIAL BUS I/F
EXTERNAL MEMORY I/F
RAM
ROM
I/O INTERFACE
DRIVER
RECEIVER
A/D CONVERTER
D/A CONVERTER
CONNECTOR
COMMUNICATION INTERFACE
CONNECTOR
32
35
36
37
38
39
40
41
42
43
44
33
45
46
52
47
48
49
50
51

FIG.4

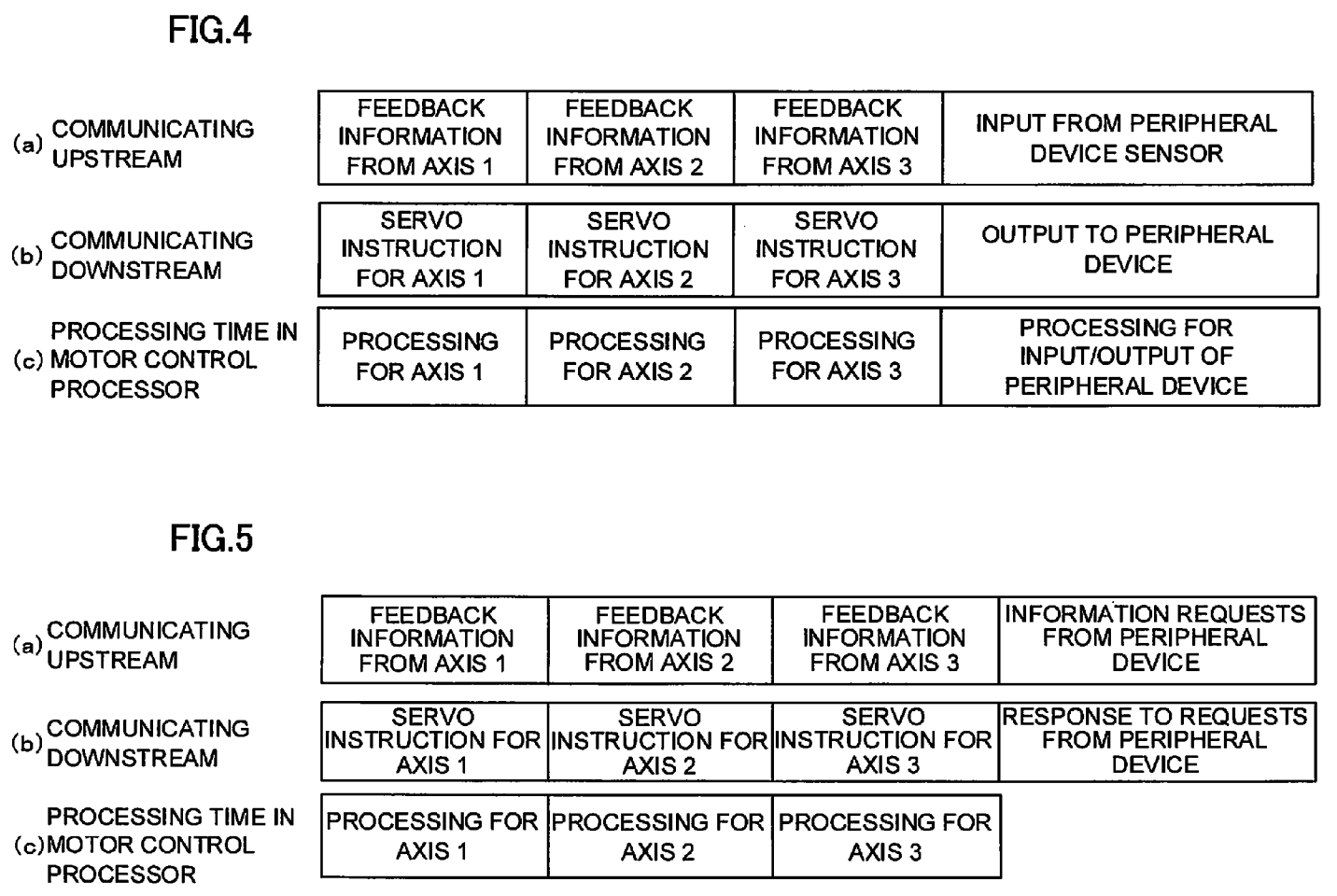

| | | | | |
|---|---|---|---|---|
| (a) COMMUNICATING UPSTREAM | FEEDBACK INFORMATION FROM AXIS 1 | FEEDBACK INFORMATION FROM AXIS 2 | FEEDBACK INFORMATION FROM AXIS 3 | INPUT FROM PERIPHERAL DEVICE SENSOR |
| (b) COMMUNICATING DOWNSTREAM | SERVO INSTRUCTION FOR AXIS 1 | SERVO INSTRUCTION FOR AXIS 2 | SERVO INSTRUCTION FOR AXIS 3 | OUTPUT TO PERIPHERAL DEVICE |
| (c) PROCESSING TIME IN MOTOR CONTROL PROCESSOR | PROCESSING FOR AXIS 1 | PROCESSING FOR AXIS 2 | PROCESSING FOR AXIS 3 | PROCESSING FOR INPUT/OUTPUT OF PERIPHERAL DEVICE |

FIG.5

| | | | | |
|---|---|---|---|---|
| (a) COMMUNICATING UPSTREAM | FEEDBACK INFORMATION FROM AXIS 1 | FEEDBACK INFORMATION FROM AXIS 2 | FEEDBACK INFORMATION FROM AXIS 3 | INFORMATION REQUESTS FROM PERIPHERAL DEVICE |
| (b) COMMUNICATING DOWNSTREAM | SERVO INSTRUCTION FOR AXIS 1 | SERVO INSTRUCTION FOR AXIS 2 | SERVO INSTRUCTION FOR AXIS 3 | RESPONSE TO REQUESTS FROM PERIPHERAL DEVICE |
| (c) PROCESSING TIME IN MOTOR CONTROL PROCESSOR | PROCESSING FOR AXIS 1 | PROCESSING FOR AXIS 2 | PROCESSING FOR AXIS 3 | |

NUMERICAL CONTROLLER WITH AN I/O CONTROL UNIT THAT GENERATES CONTROL INFORMATION USING A PROCESSOR OF THE I/O CONTROL UNIT

RELATED APPLICATIONS

The present application claims priority to Japanese Application Number 2014-171868, filed Aug. 26, 2014, the disclosure of which is hereby incorporated by reference herein in its entirety.

BACKGROUND OF THE INVENTION

1. Field of the Invention

The present invention relates to an I/O control system including a numerical controller that controls a machine such as machine tool, robot, pressing machine, injection molding machine, electric discharge machine, and laser beam machine by which work pieces are machined and amplifiers, motors, and an I/O control unit that are connected to the numerical controller through communication lines.

2. Description of the Related Art

In such a machine as machine tool, a numerical controller is usually connected to motor driving parts and to input-output parts of a peripheral device with use of separate interfaces. The numerical controller controls axes by transmitting motion commands to amplifiers of the motor driving parts and thus operating motors at a predetermined cycle in accordance with given machining programs. The numerical controller also carries out output control for the peripheral device in accordance with given programs.

Usually, however, there are differences in data transfer cycle, data transfer rate, and/or the like between the interface connected to the amplifiers and the interface connected to the peripheral device and thus a time lag associated with data transfer is caused. The time lag associated with the data transfer may be a factor that deteriorates control accuracy for the peripheral device.

For laser beam machining systems, for instance, control over output conditions such as emission, halting, peak power, frequency, and the like of a laser beam is demanded as the output control over the peripheral device. Under a condition of a machining speed in a conventional laser beam machining system, deterioration in the accuracy due to the time lag associated with the data transfer is not so highly problematic. With increase in laser machining speed in recent years, however, problems due to the deterioration in the accuracy have become obvious and synchronization between the control over servomotors and the control over the peripheral device has been demanded.

Japanese Patent Application Laid-Open No. 2006-247745 discloses a technique that eliminates the deterioration in the accuracy in the control over the peripheral device due to the time lag associated with the data transfer by connection of the motor driving parts and the peripheral device to a numerical controller with use of common communication lines and standardization of their respective interfaces.

Communication with a communication cycle on the order of 1 millisecond is used for the control over the peripheral device in such a machine as machine tool. On the other hand, the servomotors, for which high accuracy and response at accordingly higher speed are demanded, are controlled by communication with a cycle on the order of 125 microseconds to 1 millisecond. For the laser beam machining described above, however, demands for the control at a further higher speed and with further higher accuracy have been developing.

Japanese Patent Application Laid-Open No. 2006-247745 mentioned above discloses the technique by which the interfaces and the communication lines are standardized with regard to the communication used for output control over a peripheral device such as a laser oscillator and the communication used for control over servomotors. Thus, the control over output of the laser oscillator is made faster by being synchronized with the servomotors, thereby the problems are solved. It is not mentioned in the patent document, however, that information from sensors connected to the peripheral device and the like are reflected, as an input, in the control.

As means for reflecting the sensor information acquired from the peripheral device and the like, as an input, in the control, it is conceivable that the sensor information is transmitted from the peripheral device through the communication lines to a side of the numerical controller. On condition that there are a large number of types of the sensor information acquired from the peripheral device, however, it is thought that increase in ratio of sensor information in the communication may cause oppression of a communication band. It is thought as well that increase in a load on a processor on the side of the numerical controller for processing of the sensor information may interfere with the usual control over the motors. Furthermore, it is difficult to control the output with a time resolution shorter than the communication cycle of the communication lines because the sensor information acquired from the peripheral device is transferred via the communication lines to the processor that processes control inside the numerical controller, processed therein, and thereafter transferred to the output part of the peripheral device.

SUMMARY OF THE INVENTION

An object of the present invention is to provide a control system that is synchronized with motor driving parts of a machine, that allows easy increase in number of types of sensor information acquired from a peripheral device without excessive load on a processor of a numerical controller, and that is capable of controlling output to the peripheral device with higher accuracy.

An I/O control system according to the invention includes at least one motor that drives moving parts of a machine including a peripheral device, at least one amplifier that drives the motor, a numerical controller that instructs the amplifier so as to control the motor, an I/O control unit that is connected to the peripheral device, and communication lines to which the numerical controller, the amplifier, and the I/O control unit are connected. The I/O control unit that constitutes the I/O control system includes a communication interface for performing communication through the communication lines, an I/O interface that carries out input and output of signals to and from the peripheral device, and an arithmetic processing unit that generates control information for control over the peripheral device based on servo control information received through the communication interface and input data received from the peripheral device through the I/O interface and that outputs the generated control information to the peripheral device through the I/O interface.

In the I/O control system according to the invention, the servo control information and the input data from the I/O interface are processed by the arithmetic processing unit built in the I/O control unit without intervention of a processor of the numerical controller and thus output control over the peripheral device in accordance with information from sensors connected to the peripheral device can be carried out in synchronization with the motor without substantial increase in a load on the processor of the numerical controller.

The servo control information may be information on at least one of position, speed, and acceleration for control over the motor. In this aspect, control over the peripheral device in accordance with the information on the position, speed, or acceleration for the control over the motors can be carried out.

The arithmetic processing unit may be a programmable controller that processes the servo control information and the input data in accordance with sequence programs. In this aspect, response to input and output can easily be modified in the output control over the peripheral device.

The I/O control unit may include a timer that may be referred to from the arithmetic processing unit and may be configured to output the control information to the I/O interface with a time resolution shorter than a control cycle for communication through the communication lines. In this aspect, as a timer which allows to be referred to from the arithmetic processing unit is provided inside the I/O control unit, it is possible to interpolate output data, only inside the I/O control unit, based on the information from the sensors connected to the peripheral device, as a result, it becomes possible to carry out output to the peripheral device at a high speed with high accuracy, irrespective of a communication cycle through transfer paths.

The peripheral device may be a laser oscillator and the control information outputted from the I/O interface may be information for control over at least one of assist gas pressure, laser power, and focus position of a lens of the laser oscillator. In this aspect, the laser power, the assist gas pressure, and focus of the lens of the laser oscillator can be controlled at a high speed with high accuracy in a laser beam machining system.

The peripheral device may be a laser oscillator and the input data received through the I/O interface may be feedback information from the sensors mounted in the laser oscillator. In this aspect, output conditions of the laser oscillator can be controlled at a high speed with high accuracy based on the information from the sensors connected to the laser oscillator in the laser beam machining system.

The I/O control unit may be configured to output, through the communication lines, at least one piece of information included in information the I/O control unit has. In this aspect, the control information generated by the I/O control unit can be received by the numerical controller.

The invention provides the I/O control system that is synchronized with motor driving parts of the machine, that allows easy addition in number of types of the sensor information acquired from the peripheral device without an excessive load on the processor of the numerical controller, and that is capable of controlling the output to the peripheral device with higher accuracy.

BRIEF DESCRIPTION OF THE DRAWINGS

The above-mentioned and other objects and features of this invention will become apparent from the following description of embodiments with reference to the accompanying drawings, in which:

FIG. 4 is diagrams illustrating an outline of data occupancy and processing time in a motor control processor in a configuration in which input from the peripheral device is delivered and received through communication via the communication lines in the I/O control system (see FIG. 3) according to a prior art technique;

FIG. 5 is diagrams illustrating an outline of data occupancy and processing time in the motor control processor in a configuration in which the I/O control system illustrated in FIG. 3 is replaced by the I/O control system of the invention;

DETAILED DESCRIPTION OF THE PREFERRED EMBODIMENTS

Figure 1:
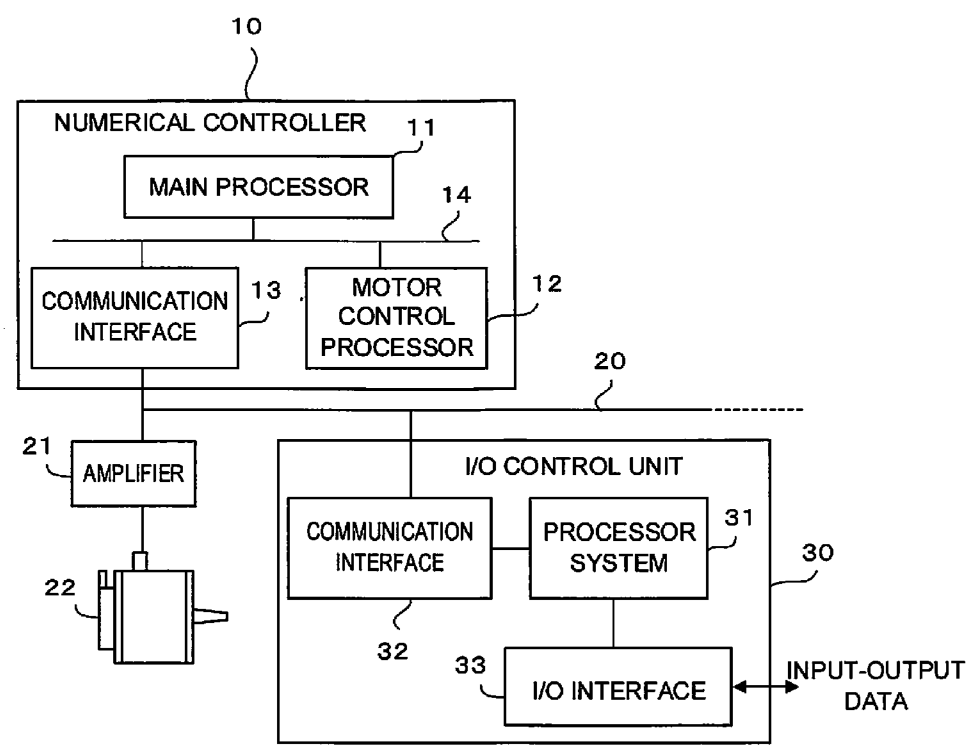
FIG. 1 is a diagram illustrating an example of a basic configuration of an I/O control system according to the invention.

An example of a basic configuration of an I/O control system according to the invention will be described with reference to FIG. 1.

The I/O control system includes a numerical controller 10, at least one amplifier 21 (one amplifier in the example of FIG. 1) that is connected to the numerical controller 10 through communication lines 20, a motor 22 such as a servomotor that is driven by the amplifier 21, and an I/O control unit 30. The numerical controller 10 includes a main processor 11, a motor control processor 12, and a communication interface 13. The I/O control unit 30 includes a processor system (CPU) 31, a communication interface 32, and an I/O interface 33.

The motor control processor 12 calculates a speed at which the motor 22 rotates in a speed control cycle in accordance with a motion command for the motor 22 calculated by the main processor 11, calculates a torque required for acquisition of the calculated speed, that is, a current command, in each current control cycle, and calculates on/off information for a transistor (not illustrated) in the amplifier 21 that performs switching of a current to the motor 22. The motor control processor 12 transmits the calculated on/off information via the communication interface 13 to the amplifier 21 connected to the communication lines 20. Then the amplifier 21 sends a current, based on the command, to the motor 22 and thereby rotates the motor 22.

The I/O control unit 30 may acquire servo control information through the communication lines 20. The servo control information includes a servo command that is transmitted from the numerical controller to the amplifier, information on position, speed, and acceleration that is held as internal information by the numerical controller, and feedback information such as information on an encoder connected to the motor and current information. Based on the servo control information acquired through the communication lines 20 and input data acquired from the I/O interface 33, the I/O control unit 30 carries out processing by a CPU core 35 built into a processor 34, generates control information for control over a peripheral device connected to the I/O control unit 30, and controls output signals that are to be outputted to outside of the I/O control unit 30.

Figure 2:
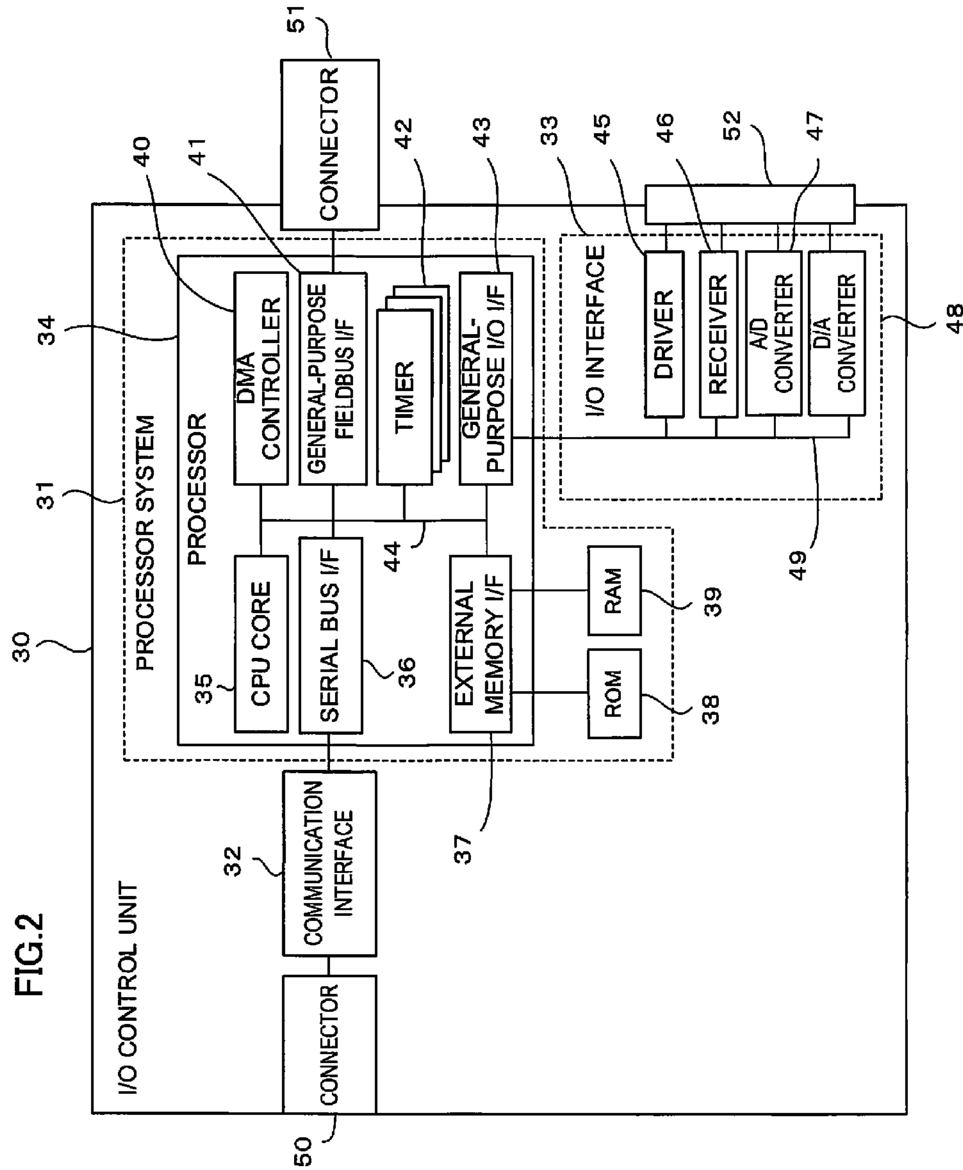
FIG. 2 is a block diagram illustrating an example of a basic configuration of an I/O control unit that constitutes the I/O control system of FIG. 1.

FIG. 2 is a block diagram illustrating an example of a basic configuration of the I/O control unit that constitutes the I/O control system of FIG. 1.

The I/O control unit 30 includes a connector 50 for connection to the high-speed communication lines 20 to which the amplifier 21 is connected. Signals that are transmitted and received through the connector 50 are transmitted and received by the processor 34 through the communication interface 32. The communication interface 32 carries out signal conversion between the communication lines 20 (FIG. 1) to which the amplifier 21 is connected and a serial bus interface 36 the processor 34 includes. Optical communication may be used for the communication lines 20. Influence of disturbance such as noises may be reduced by use of the optical communication.

The processor 34 includes the CPU core 35 that carries out processing in accordance with programs stored in a CPU memory (ROM 38, for instance), the serial bus interface 36 that carries out serial communication with exterior, a general-purpose fieldbus interface 41, an external memory interface 37 that provides interface with external memories composed of the ROM 38, a RAM 39, and the like, a general-purpose I/O interface 43 that provides interface for digital/analog I/O information with the peripheral device such as a laser beam oscillator, at least one timer 42, and a DMA controller 40 that carries out data transfer among those elements.

The general-purpose fieldbus interface 41 carries out communication with use of a protocol for general-purpose fieldbus such as DeviceNet, EtherNet/IP, and EtherCAT. Slave units compatible with general-purpose fieldbus are connected to the general-purpose fieldbus interface 41. Digital input-output units, analog input-output units, and/or the like are connected as the slave units. Those elements are connected to one another through a high-speed bus 44 inside the processor 34.

Programs the CPU core 35 executes are stored in the ROM 38 and data to be stored temporarily is stored in the RAM 39. The ROM 38 and the RAM 39 may be provided outside the processor 34 or may be provided inside the processor 34. The timer 42 may be provided inside the processor 34 or may be provided at a location that is outside the processor 34 and that may be referred to from the processor 34.

The processor 34 exchanges input-output data with external devices, the peripheral device (not illustrated), and the like through the general-purpose fieldbus interface 41 and the general-purpose I/O interface 43. For input-output signals of the general-purpose I/O interface 43 of the processor 34, signal conversion for the peripheral device is carried out through a driver 45, a receiver 46, and the like, because a current and voltage to be treated are extremely low. An A/D converter 47 or a D/A converter 48 may be provided for input and output of analog signals to and from the peripheral device.

The servo control information acquired from the communication lines 20 through the connector 50 is stored into the RAM 39 through the communication interface 32, the serial bus interface 36, and the external memory interface 37. Information that is delivered and received to and from the external devices through the general-purpose fieldbus interface 41 is stored in a buffer (not illustrated) in the general-purpose fieldbus interface 41. Data transfer between the buffer in the general-purpose fieldbus interface 41 and the RAM 39 is carried out by the DMA controller 40.

The CPU core 35 processes the servo control information stored in the RAM 39 and the input data acquired from the peripheral device through the general-purpose I/O interface 43, generates the control information for the control over the peripheral device based on the processed information, and outputs the generated control information to the peripheral device through the general-purpose I/O interface 43. Then output may be controlled with a fine time resolution by interruption by the timer 42. The generated control information may be outputted through the general-purpose fieldbus interface 41 to the external devices such as a personal computer connected to a connector 51.

Figure 3:
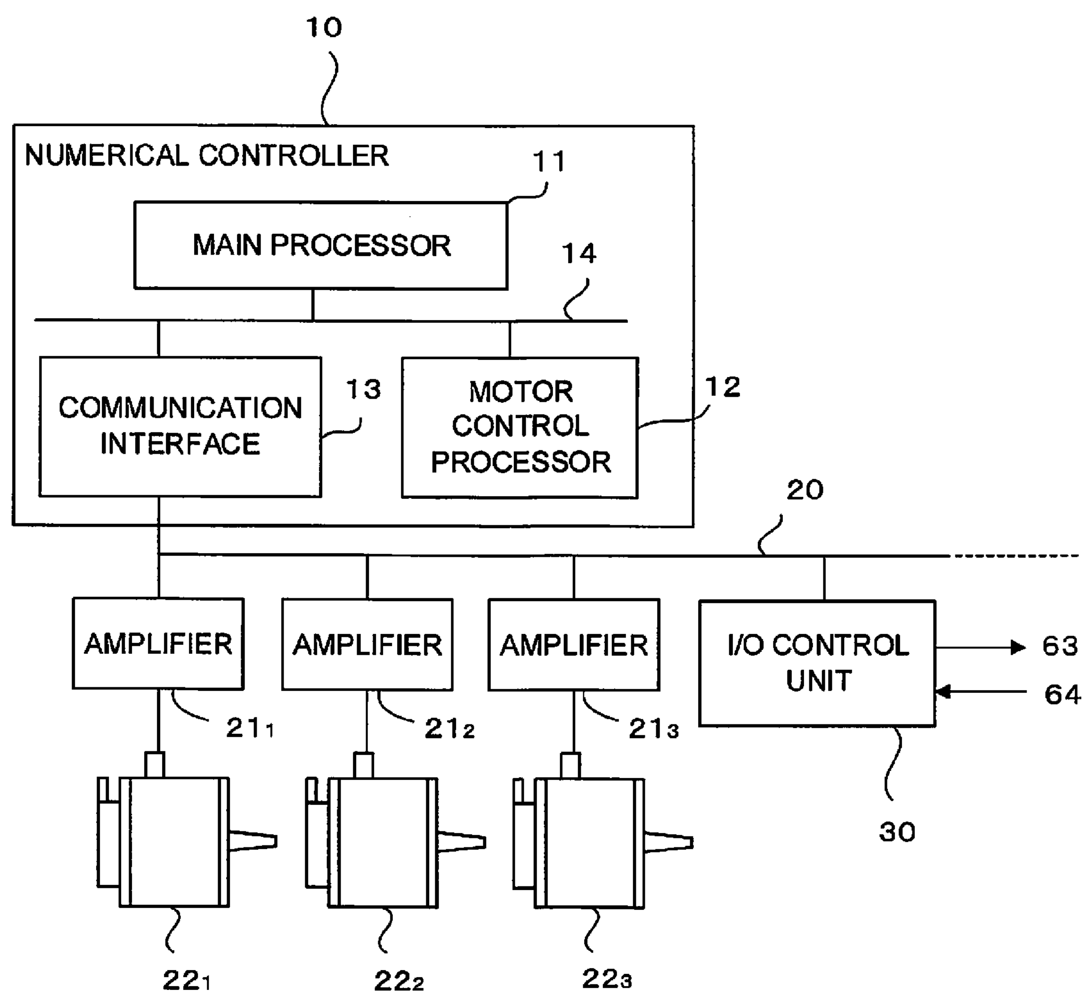
FIG. 3 is a diagram illustrating an I/O control system that includes a numerical controller and three servo axes and one type of I/O control unit which are connected to communication lines and that controls input from sensors and output to a laser oscillator.

Subsequently, effects of the invention will be described in detail. FIG. 3 illustrates an I/O control system that includes the numerical controller 10 and three servo axes and one type of I/O control unit 30 which are connected to the communication lines 20 and that controls input from a sensor 64 and output to a laser oscillator 63. The three servo axes are composed of a first amplifier $\mathbf{21}_1$ and a first motor $\mathbf{22}_1$, a second amplifier $\mathbf{21}_2$ and a second motor $\mathbf{22}_2$, and a third amplifier $\mathbf{21}_3$ and a third motor $\mathbf{22}_3$.

FIG. 4 is diagrams illustrating an outline of data occupancy and processing time in the motor control processor 12 in a configuration in which input from a peripheral device is delivered and received through communication via the communication lines 20 in the I/O control system (see FIG. 3) according to a prior art technique. In FIG. 4, part (a) illustrates communicating upstream, part (b) illustrates communicating downstream, and part (c) illustrates the processing time in the motor control processor.

Information that is received by the numerical controller 10 of FIG. 3 will be considered.

The information that is received by the numerical controller 10 includes input data on sensors and/or the like from the peripheral device, in addition to the servo control information (see part (a) in FIG. 4). As number of the sensors and/or the like increases, a bandwidth occupied by the input data from the sensors tends to increase. It is expected that number of types and the like of the required sensors will increase, in consideration of a tendency in recent years for machining with high accuracy to be demanded, and thus the increase in the bandwidth occupied by the input data may cause a problem in the communication.

Subsequently, output from the numerical controller 10 in the communication lines 20 will be considered.

As output signals from the numerical controller 10, output to the peripheral device is communicated in addition to servo commands for the axes (see part (b) in FIG. 4). As for the output as with input, control over various types of output has been demanded for machining with high accuracy that has been demanded in recent years and it is thus conceivable that a communication band on output side is thereby oppressed as well.

Subsequently, loads on the motor control processor in the numerical controller 10 will be considered.

In the prior art technique, a common processor is used for communication for motor control and control over the peripheral device for standardizing interfaces therefor, and the control by the motor control processor 12 is carried out. With speeding up of control over peripheral devices and increase in number of types of input and output that are to be controlled, however, occupancy of processing time for the control over peripheral devices has been increasing (see part (c) in FIG. 4).

The effects of the invention in contrast to the above prior art technique illustrated in FIG. 4 will be described with reference to FIG. 5.

FIG. 5 is diagrams illustrating an outline of data occupancy and processing time in the motor control processor in a configuration in which the I/O control system illustrated in FIG. 3 is replaced by the I/O control system (including the I/O control unit 30) of the invention. In FIG. 5, part (a) illustrates communicating upstream, part (b) illustrates communicating downstream, and part (c) illustrates the processing time in the motor control processor.

Data that is received by the numerical controller 10 of FIG. 3 is composed of feedback information from the axes and information requests to the numerical controller 10. Data that is transmitted by the numerical controller 10 is composed of the servo commands for the axes and response data to the information requests to the numerical controller 10.

The I/O control unit 30 is capable of acquiring the servo control information from the numerical controller 10 by sending an information request to the numerical controller 10 to cause the numerical controller 10 to transmit the servo control information. The information request (request for the servo control information or the like) to the numerical controller 10, the servo control information that is transmitted from the numerical controller 10, and the like do not undergo change in amount of data depending on the information from the sensor 64 and the like and do not interfere with the increase in the number of types of the sensor 64.

In the I/O control unit 30 of the invention, in contrast to the prior art technique, output to the peripheral device is processed by the processor 34 (see FIG. 2) built in the I/O control unit 30. Thus increase in a load on processing in the motor control processor 12 is curbed. The output (control information for the control over the peripheral device) can be controlled with a time resolution finer than a communication cycle of the communication lines 20 by interrupt processing with use of the timer 42 provided inside the processor 34.

Figure 6:
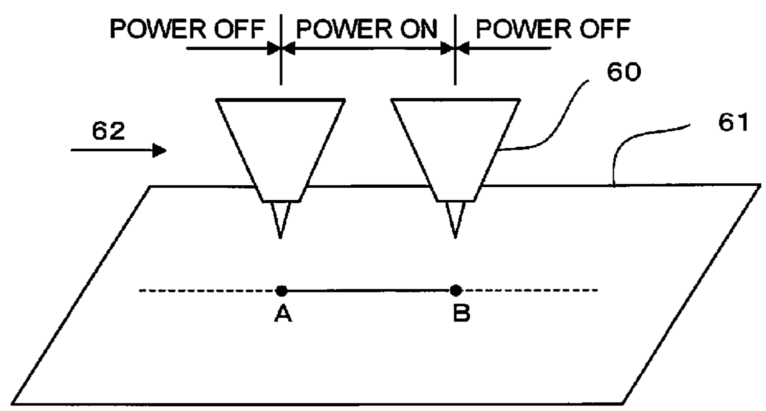
FIG. 6 is a diagram illustrating an example in which the I/O control system of the invention is applied to laser beam machining, for description on effects of the I/O control system of the invention.

FIG. 6 is a diagram illustrating an example in which the I/O control system of the invention is applied to laser beam machining, for description on effects of the I/O control system of the invention.

A laser beam machine (not illustrated) includes a table (not illustrated) that supports a workpiece 61, a machining nozzle 60 that irradiates the workpiece 61 with a laser beam, and servomotors (not illustrated) that drive the table and the machining nozzle 60. A position/speed detector that detects a position and a speed is provided in each of the servomotors. Information on the position and the speed detected by the position/speed detector is fed back to an amplifier (not illustrated) that drives the servomotor. The information on the position and the speed that is fed back to the amplifier is outputted from the amplifier to the numerical controller. The numerical controller generates a servo command for driving the motor based on a motion command generated by the numerical controller and the feedback information.

As illustrated in FIG. 6, the machining nozzle 60 irradiating a laser beam moves in one direction at a fixed speed along a surface of the workpiece 61 and carries out machining by adjustment in power of the laser beam. Machining for a slit is carried out with the power of the laser beam turned off to a point A, turned on from the point A to a point B, and turned off beyond the point B.

Figure 7:
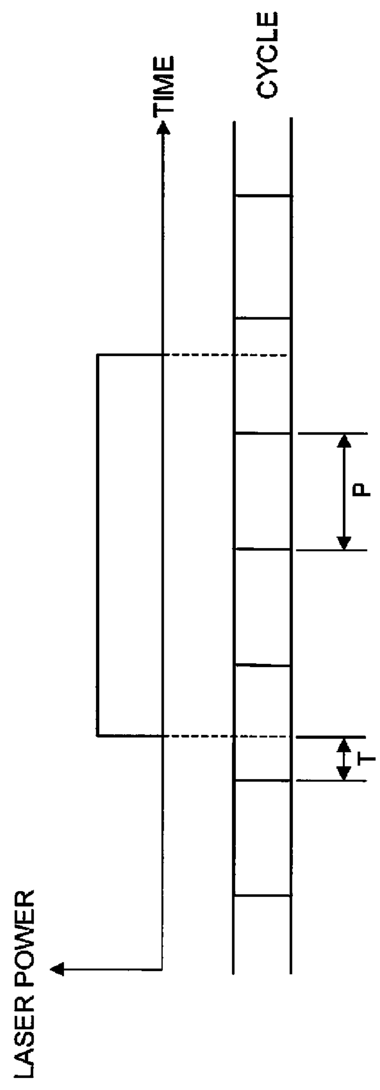
FIG. 7 is a diagram illustrating an example of laser beam machining in which an I/O control system disclosed in a prior art document is used.

FIG. 7 illustrates an example of laser beam machining in which the I/O control system disclosed in Japanese Patent Application Laid-Open No. 2006-247745 described above is used.

In this publicly known technique, timing (T in FIG. 7) of on/off switching of laser power is integrated into serial data, timing data, thereby enabling machining with a time resolution shorter than a specified cycle.

In the invention, by contrast, it is unnecessary to transmit information (T illustrated in FIG. 7) through the communication lines 20 and the timing of power-on/off can be controlled by processing by means of the processor (CPU) 34 built in the I/O control unit 30, based on the servo control information.

Figure 8:
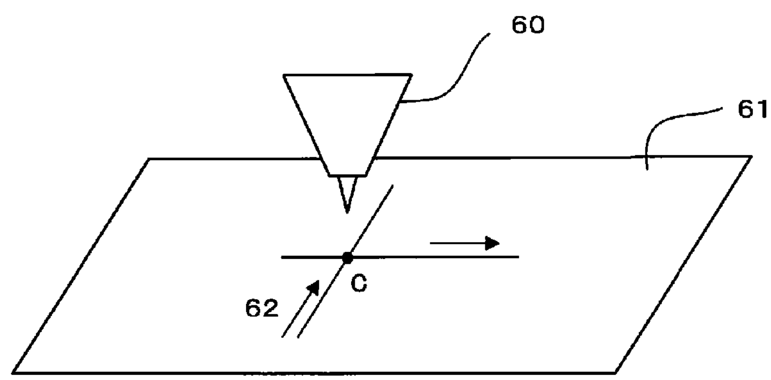
FIG. 8 is a diagram illustrating an example in which the I/O control system of the invention is applied to laser beam machining, for description on additional effects of the I/O control system of the invention.

FIG. 8 is a diagram illustrating an example in which the I/O control system of the invention is applied to laser beam machining, for description on additional effects of the I/O control system of the invention.

Movement of the machining nozzle 60 is carried out based on control over the servo axes. In general, an accurate trajectory can be acquired by control that decreases servo speed at a point C where a travelling direction (nozzle travelling direction 62) of the machining nozzle 60 is switched. In consideration of power intensity of a laser beam, decrease in speed of the machining nozzle causes a demand for adjustment in the power intensity of the laser beam in accordance with the decrease in the speed.

Figure 9:
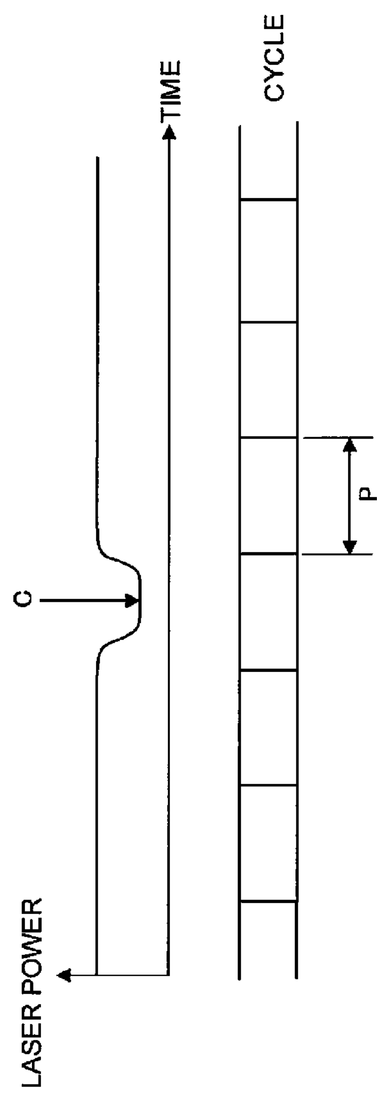
FIG. 9 is a diagram illustrating fluctuation in laser power with respect to cycles.

FIG. 9 is a diagram illustrating control over the power that corresponds to the decrease in the speed of the machining nozzle at such a corner as described above, for instance. In the configuration of the prior art technique, acquisition of such smooth response as illustrated in FIG. 9 might require analog control over the laser power at an extremely large number of timings and transmission of multi-bit data and is thus difficult to attain in terms of communication band.

In the invention in which the power is controlled on basis of the servo information by the CPU (processor system 31) built in the I/O control unit 30, the power can be controlled more smoothly in synchronization with servo as illustrated in FIG. 9 and machining at higher speed and with higher accuracy than in the prior art technique can be attained.

It is further demanded in laser beam machining to receive reflected beams by means of sensors and control the power of a laser beam based on the acquired information. As an example, an I/O control system having such a configuration as illustrated in FIG. 3 will be considered.

In such a prior art technique as disclosed in Japanese Patent Application Laid-Open No. 2006-247745 described above, the information acquired from the sensors is transferred through the communication lines to the motor control processor built in the numerical controller and is outputted, after completion of data processing, through the communication lines to the laser oscillator. As information is required to shuttle on a communication line, however, it is difficult to control the power of the laser oscillator with a time resolution shorter than the communication cycle of the communication line.

In the configuration according to the invention, as illustrated in FIG. 3, the input data from the sensor 64 is processed by the processor built in the I/O control unit 30 without the communication lines 20 lying between them and is controlled as output. Thus the processing irrespective of the communication cycle of the communication lines 20 and the response at higher speed are enabled. It is thought that precisions of machined surfaces in the laser beam machining can consequently be improved. The invention is not limited to laser beam machines and may be applied to machines including peripheral devices, such as machine tools, robots, pressing machines, injection molding machines, and electric discharge machines by which workpieces are machined.

The invention claimed is:

1. An I/O control system, comprising:

at least one motor configured to drive moving parts of a machine including a peripheral device;

at least one amplifier configured to drive the motor;

a numerical controller configured to instruct the amplifier so as to control the motor;

an I/O control unit connected to the peripheral device; and communication lines to which the numerical controller, the amplifier, and the I/O control unit are connected, wherein the I/O control unit includes a communication interface configured to perform communication through the communication lines, an I/O interface configured to carry out input and output of signals to and from the peripheral device, a processor configured to generate control information for control over the peripheral device based on (i) servo control information received through the communication interface and (ii) input data received from the peripheral device through the I/O interface, and output the generated control information to the peripheral device through the I/O interface, and a timer referable to from the processor, wherein the I/O control unit is configured to output the generated control information to the I/O interface with a time resolution shorter than a control cycle for communication through the communication lines, the numerical controller includes a further processor different from the processor of the I/O control unit, and the further processor is configured to generate a part of the servo control information.

2. The I/O control system according to claim 1, wherein the servo control information is information on at least one of position, speed, and acceleration for control over the motor.

3. The I/O control system according to claim 1, wherein the processor is configured to process the servo control information and the input data in accordance with sequence programs.

4. The I/O control system according to claim 1, wherein the peripheral device is a laser oscillator and the control information outputted from the I/O interface is information for control over at least one of assist gas pressure, laser power, and focus position of a lens of the laser oscillator.

5. The I/O control system according to claim 1, wherein the peripheral device is a laser oscillator and the input data received through the I/O interface is feedback information from sensors mounted in the laser oscillator.

6. The I/O control system according to claim 1, wherein the I/O control unit is configured to output, through the communication lines, at least one piece of information included in information the I/O control unit has.

7. The I/O control system according to claim 1, wherein the numerical controller further includes a further communication interface configured to perform communication with the amplifier and the communication interface of the I/O control unit through the communication lines, and the numerical controller is configured to output said part of the servo control information to the I/O control unit through the further communication interface of the numerical controller, the communication lines and the communication interface of the I/O control unit.

8. The I/O control system according to claim 1, wherein the I/O control unit is configured to, by interrupt processing with use of the timer, output the generated control information to the I/O interface with the time resolution shorter than the control cycle for communication through the communication lines.

9. The I/O control system according to claim 1, wherein the I/O control unit is configured to output the generated control information to the peripheral device through the I/O interface, without transmitting the generated control information through the communication lines.

10. The I/O control system according to claim 1, wherein, in the I/O control unit, the communication interface is configured to receive the servo control information from the communication lines, the I/O interface is configured to receive the input data from the peripheral device, without said input data being transmitted through the communication lines, the processor is configured to generate the control information based on (i) the servo control information received through the communication interface from the communication lines and (ii) the input data received through the I/O interface without being transmitted through the communication lines, and output the generated control information to the peripheral device through the I/O interface, without said generated control information being transmitted through the communication lines.

* * * * *